United States Patent
Jagannath et al.

(10) Patent No.: US 11,271,681 B2
(45) Date of Patent: Mar. 8, 2022

(54) RATE-2 COMPLEX SPACE-TIME BLOCK CODES FOR 3×3 AND 4×4 MIMO SYSTEMS

(71) Applicant: ANDRO Computational Solutions, LLC, Rome, NY (US)

(72) Inventors: Anu Jagannath, Oriskany, NY (US); Jithin Jagannath, Oriskany, NY (US); Andrew Louis Drozd, Rome, NY (US)

(73) Assignee: ANDRO COMPUTATIONAL SOLUTIONS, LLC, Rome, NY (US)

(*) Notice: Subject to any disclaimer, the term of this patent is extended or adjusted under 35 U.S.C. 154(b) by 0 days.

(21) Appl. No.: 16/825,226

(22) Filed: Mar. 20, 2020

(65) Prior Publication Data

US 2021/0306100 A1    Sep. 30, 2021

(51) Int. Cl.
*H04L 1/06* (2006.01)
*H04B 7/0413* (2017.01)
*H04L 1/00* (2006.01)

(52) U.S. Cl.
CPC ......... *H04L 1/0643* (2013.01); *H04B 7/0413* (2013.01); *H04L 1/0054* (2013.01); *H04L 1/0625* (2013.01); *H04L 1/0668* (2013.01)

(58) Field of Classification Search
CPC ... H04L 1/0643; H04L 1/0054; H04L 1/0625; H04L 1/0668; H04B 7/0413
See application file for complete search history.

(56) References Cited

U.S. PATENT DOCUMENTS

| | | | |
|---|---|---|---|
| 8,139,677 B2 | 3/2012 | Mujtaba et al. | |
| 8,194,760 B2 | 6/2012 | Papadopoulos | |
| 8,290,080 B2 | 10/2012 | Lee | |
| 8,644,235 B2 | 2/2014 | Saito et al. | |
| 8,644,407 B2 | 2/2014 | Qu | |
| 2005/0185730 A1* | 8/2005 | Hansen | H04L 1/065 375/267 |
| 2017/0187433 A1* | 6/2017 | Khsiba | H04L 1/0031 |
| 2018/0083732 A1* | 3/2018 | Rekaya-Ben Othman | H04L 1/0668 |

FOREIGN PATENT DOCUMENTS

| | | |
|---|---|---|
| EP | 2078397 | 7/2009 |
| EP | 2139148 A1 | 12/2009 |

OTHER PUBLICATIONS

Jagannath et al., "Towards Higher Spectral Efficiency: Rate-2 Full-Diversity Complex Space-Time Block Codes," Macroni-Rosenblatt AI/ML Innovation Laboratory, ANDRO Computational Solutions, LLC, Rome, NY, 13440, retrieved Aug. 3, 2019, 6 pages.
Jagannath et al., "Jammer Resilient Adaptive Mimo Transceiver Design," Macroni-Rosenblatt AI/ML Innovation Laboratory, ANDRO Computational Solutions, LLC, Rome, NY, 13440, 5 pages.

* cited by examiner

*Primary Examiner* — Janice N Tieu

(74) *Attorney, Agent, or Firm* — Hoffman Warnick LLC

(57) ABSTRACT

Embodiments of the disclosure provide a transmission system, including: an encoder for encoding a set of information symbols into a set of encoded signals for transmission, wherein the encoder applies a full-diversity space-time block code (STBC) to the set of information symbols; and at least three antennas for transmitting the set of encoded signals over four epochs at a code rate of two.

16 Claims, 6 Drawing Sheets

RATE-2 COMPLEX SPACE-TIME BLOCK CODES FOR 3×3 AND 4×4 MIMO SYSTEMS

BACKGROUND

The present disclosure relates to communication systems, and more specifically, to rate-2 full-diversity complex space-time block codes for 3 and 4 antenna systems.

Massive multiple-input multiple-output (MIMO) techniques have received significant attention in recent years as a key enabling technology for Fifth-Generation (5G) mobile communication systems. Massive MIMO systems attain higher transmission rates owing to the large number of antennas being used at a base station. Space-time block codes (STBC) have been used to achieve higher transmission rates by exploiting transmit antenna diversity. A simple transmit diversity scheme that exploited two transmit antennas was adopted in the Third Generation (3G) Mobile standard.

STBC provides higher levels of spectral efficiencies for a fixed bandwidth and error-rate. It has been shown that STBC can achieve a phenomenal increase in capacity in contrast to single transmit/receive antenna systems. To accommodate rapidly growing communication traffic, one design goal of 5G technologies is to improve area throughput (bits/s/km2), which is directly related to bandwidth, base station density, and spectral efficiency. Among these, improving spectral efficiency without increasing the bandwidth or base station density may be attainable using MIMO techniques.

The spectral efficiency for a MIMO system may be increased by increasing the coding rate of the STBC. Higher order modulation support is important for attaining higher spectral efficiency. A 4×4 STBC that achieves rate-1 by relaxing the orthogonality constraint and a 4×3 rate-1 STBC design have also been proposed in the literature. Here again, the orthogonality is compromised to achieve rate-1.

Orthogonal STBC achieves full rate and allows single complex symbol maximum-likelihood (ML) decoding for two transmit antennas. The full rate vanishes as the number of transmit antennas increases to more than two. It has been shown per the Hurwitz-Radon theorem that complex orthogonal STBC cannot possess a full rate and maximum diversity. The rate-loss with complex signal constellations while using more than two transmit antennas is the biggest drawback of orthogonal STBCs. Therefore, STBCs that achieve higher coding rates and minimal decoding complexities are generally preferred. It has been conjectured that for square matrix embeddable codes, the maximum achievable rate for three and four transmit antennas is 3/4. Current STBC designs achieve a rate not more than 1 for more than two transmit antennas.

SUMMARY

A first aspect of the disclosure is directed to a transmission system, including: an encoder for encoding a set of information symbols into a set of encoded signals for transmission, wherein the encoder applies a full-diversity space-time block code (STBC) to the set of information symbols; and at least three antennas for transmitting the set of encoded signals over four epochs at a code rate of two.

A second aspect of the disclosure is directed to a method for transmitting data, including: encoding a set of information symbols into a set of encoded signals by applying a full-diversity space-time block code (STBC) to the set of information symbols; and transmitting the set of encoded signals over four epochs using at least three antennas at a code rate of two.

A third aspect of the disclosure is directed to a communication system, including: a transmission system including: an encoder for encoding a set of information symbols into a set of encoded signals for transmission, wherein the encoder applies a full-diversity space-time block code (STBC) to the set of information symbols; and at least three antennas for transmitting the set of encoded signals over four epochs at a code rate of two; and a receiving system for decoding the set of encoded signals, the decoding having a complexity of $O(Q)$ for a constellation cardinality of Q.

The foregoing and other features of the disclosure will be apparent from the following more particular description of embodiments of the disclosure.

BRIEF DESCRIPTION OF THE DRAWINGS

The embodiments of this disclosure will be described in detail, with reference to the following figures, wherein like designations denote like elements.

Figure 1:
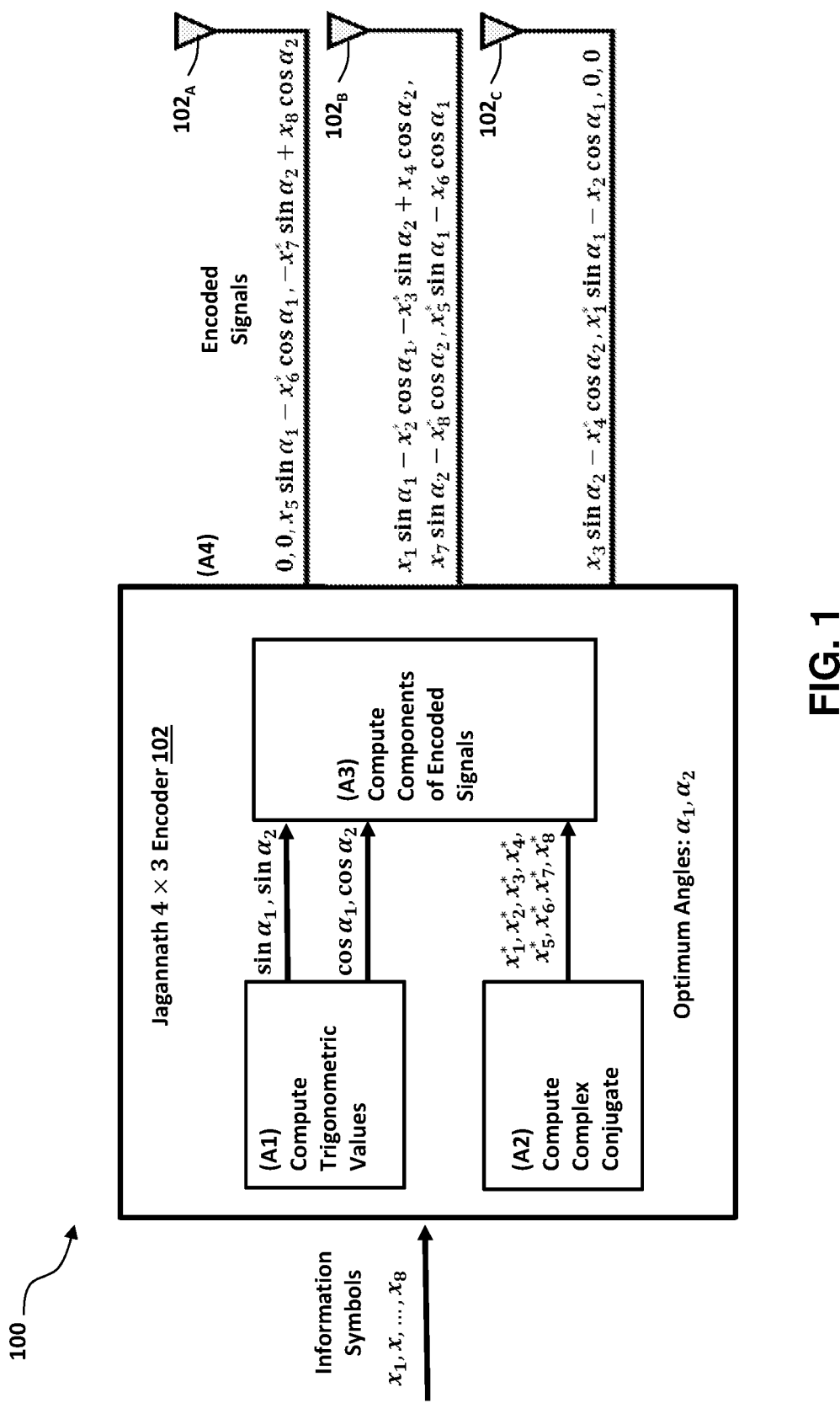
FIG. 1 depicts a data flow block diagram of a transmission system including a rate-2 full-diversity complex Jagannath 4×3 space-time block code (STBC) encoder for a three antenna system according to embodiments.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

The present disclosure relates to communication systems, and more specifically, to rate-2 full-diversity complex space-time block codes for 3 and 4 antenna systems.

In the following disclosure, the following notations are used: vectors and matrices are denoted by lowercase and uppercase boldface letters; a Hermitian transpose of a vector or matrix and complex conjugate operator are denoted by $(.)^H$ and $(.)^*$; the determinant of a matrix is denoted by $\det(.)$; absolute value and ceil operators are denoted by $|.|$ and $\lceil . \rceil$; and the real and imaginary parts of complex numbers are denoted by $\Re(.)$ and $\Im(.)$.

Space-time block coding (STBC) refers to a channel coding technique that exploits antenna diversity. An STBC is a matrix of size T×N with real or complex symbols and their conjugates or their permutations in its entries. Here, N refers to the number of transmit antennas and T denotes number of channel uses (epochs) over which the symbols are sent from the N antennas. A simple example of a complex orthogonal STBC matrix is a 2×2 code proposed by Alamouti that transmits two symbols $x_1$ and $x_2$ over two epochs $$C_2 = \begin{bmatrix} x_1 & x_2 \\ -x_2^* & x_1^* \end{bmatrix}. \tag{1}$$

Definitions

Code rate: If a T×N STBC matrix transmits S symbols over T epochs, then the code rate R is defined as S/T symbols per channel use (symbols/s/Hz). As such, the Alamouti code $C_2$ (Equation (1)) provides a rate of R=2/2=1. The maximal rate of such a square matrix embeddable orthogonal STBC has been found to be:

$$R_{max} = \frac{\lceil \log_2 N + 1 \rceil}{2 \lceil \log_2 N \rceil}. \tag{2}$$

To achieve a rate beyond this established bound, orthogonality is sacrificed.

Orthogonality: A generalized complex T×N STBC matrix C with entries drawn from the set $\{0, \pm x_1, \ldots, \pm x_n, \ldots, \pm x_1^*, \ldots, \pm x_n^*\}$ or their product with $i = \sqrt{-1}$ is said to be orthogonal if $C^H C = D$, where D is a diagonal matrix with $j^{th}$ diagonal entry $$D(j,j) = (c_1^j|x_1|^2 + c_2^j|x_2|^2 + \ldots + c_n^j|x_n|^2) \tag{3}$$

where the coefficients $\{c_1^i, c_2^i, \ldots, c_n^i\}$ are strictly positive numbers. Similarly, a T×N generalized real orthogonal STBC matrix $C_R$ with entries drawn from set of real numbers $\{0, \pm x_1, \ldots, \pm x_n\}$ and diagonal matrix $D_\mathbb{R}$ with $j^{th}$ diagonal entry $$D_\mathbb{R}(j,j) = (c_1^j x_1^2 + c_2^j x_2^2 + \ldots + c_n^j x_n^2) \tag{4}$$

and coefficients $\{c_1^i, c_2^i, \ldots, c_n^i\}$ are strictly positive numbers. Considering a Rayleigh flat-fading channel $H \in \mathbb{C}^{N \times N}$ with independent identically distributed (i.i.d) entries from CN(0, 1), the received symbol matrix for an N×N MIMO transmission can be modeled as $$Y = \sqrt{\frac{\rho}{N}} CH + N \tag{5}$$

where $Y \in \mathbb{C}^{T \times N}$ is the received signal matrix, $C \in \mathbb{C}^{T \times N}$ is the STBC matrix, $N \in \mathbb{C}^{T \times N}$ is the additive white Gaussian noise matrix with i.i.d. entries from $CN(0, N_0)$. Assuming perfect channel state information (CSI) at the receiver, the maximum-likelihood (ML) decoding metric can be expressed as $$\hat{x} = \arg\min_x \|Y - CH\|_F^2. \tag{6}$$

Here, if x is drawn from a constellation with cardinality Q, the ML decoding complexity is given by $\mathcal{O}(Q)$.

Decoding Complexity: The minimum number of symbols that need to be jointly decoded in minimizing the decoding metric defines the decoding complexity of a MIMO system. A decoding complexity of $\mathcal{O}(Q^k)$ implies an exhaustive search over k information symbols from a signal constellation with cardinality Q. Here $\mathcal{O}(.)$ denotes the big omicron. ML decoding that can be expressed by the form in equation (6) is also referred to as single-symbol decodable.

Spectral Efficiency: The measure of amount of useful bits that are transmitted per epoch defines the spectral efficiency of an STBC and can be expressed as $$\eta = R \log_2 Q \text{ bits/s/Hz} \tag{7}$$

An STBC with a higher coding rate will, therefore, improve the spectral efficiency of the MIMO system for a given modulation.

Coding Delay: The number of epochs over which the symbols of an STBC are transmitted is referred to as the coding delay. This is the same as the block length of the STBC. For a T×N STBC, the coding delay or block length is T.

A 4×4 STBC proposed by Jafarkhani is a quasi-orthogonal design that builds upon the Alamouti code. Jafarkhani code achieves a rate-1 by transmitting four complex symbols over four epochs. By denoting the Alamouti encoding of symbols $x_1$ and $x_2$ as $C_{12} = C_2$, the 4×4 Jafarkhani STBC corresponding to symbols $x_1, x_2, x_3$, and $x_4$ takes the form $$C_J = \begin{bmatrix} C_{12} & C_{34} \\ -C_{34*} & C_{12*} \end{bmatrix}. \tag{8}$$

The Jafarkhani design demonstrates the rate increase achieved by relaxing the orthogonality constraint, which defies the $R_{max}$ bound for complex orthogonal designs.

A rate-1 4×3 non-orthogonal STBC design has been proposed that again uses combinations of Alamouti structures to transmit four symbols over four epochs from three transmit antennas as $$C_{NO} = \begin{bmatrix} C_{12} & -c_{34} \\ C_{34} & c_{12} \end{bmatrix} \tag{9}$$

where $C_{12} = [x_1 \ x_2]^T$ and $c_{34} = [x_3 \ x_4]^T$. To this extent, it is straightforward to realize that R=4/4=1 symbol/s/Hz.

Jagannath 4×3 STBC

A rate-2 orthogonal design $C_{P3}$ for three transmit antennas according to embodiments, designated herein as "Jagannath 4×3 STBC," is provided in equation (12):

$$C_{P3} = \begin{bmatrix} 0 & x_1\sin\alpha_1 - x_2^*\cos\alpha_1 & x_3\sin\alpha_2 - x_4^*\cos\alpha_2 \\ 0 & -x_3^*\sin\alpha_2 + x_4\cos\alpha_2 & x_1^*\sin\alpha_1 - x_2\cos\alpha_1 \\ x_5\sin\alpha_1 - x_6^*\cos\alpha_1 & x_7\sin\alpha_2 - x_8^*\cos\alpha_2 & 0 \\ -x_7^*\sin\alpha_2 + x_8\cos\alpha_2 & x_5^*\sin\alpha_1 - x_6\cos\alpha_1 & 0 \end{bmatrix} \quad (12)$$

Here, eight symbols are encoded for transmission from three transmit antennas over four epochs resulting in a rate-2 transmission. For ease of reference, the two symbol encoding is denoted as $$J_{x,xi+1}{}^t = x_i \sin\alpha_t - x_{i+1}^* \cos\alpha_t.$$

The orthogonality of the Jagannath 4×3 STBC can be verified as $$C_{P3}^H C_{P3} = \begin{bmatrix} D & 0 & 0 \\ 0 & F & 0 \\ 0 & 0 & C \end{bmatrix} \quad (13)$$

where $$C = {J_{x_1,x_2}^1}^2 + {J_{x_3,x_4}^2}^2$$
$$D = {J_{x_5,x_6}^1}^2 + {J_{x_7,x_8}^2}^2$$

and F=C+D. The columns of $C_{P3}$ are orthogonal to each other with the standard dot product of different columns being different.

FIG. 1 depicts a data flow block diagram of a transmission system 100 including a rate-2 full-diversity complex Jagannath 4×3 space-time block code (STBC) encoder 102 for a three antenna system according to embodiments.

As shown in FIG. 1, a set of information symbols $x_1$, $x_2, \ldots, x_n$ (e.g., quadrature amplitude modulation (QAM) information symbols) is encoded for transmission by the Jagannath 4×3 STBC encoder 102 in accordance with equation (12) from three transmit antennas $102_A$, $102_B$, $102_C$ over four epochs resulting in a rate-2 transmission. The Jagannath 4×3 STBC encoder 102 encodes the set of information symbols $x_1, x_2, \ldots, x_n$ into encoded signals, which are transmitted from the transmit antennas $102_A$, $102_B$, $102_C$ in accordance with equation (12).

According to embodiments, the Jagannath 4×3 STBC encoder 102 may perform the following processes:

Process A1—Compute trigonometric values (e.g., sine, cosine) for the angles $\alpha_1$ and $\alpha_2$, which are design parameters chosen in a manner known in the art to maximize coding gain. (See, e.g., V. Vakilian and H. Mehrpouyan, "High Rate/Low Complexity Space-Time Block Codes for 2×2 Reconfigurable MIMO Systems," IEEE Communications Letters, vol. 20, pp. 1227-1230, June 2016).

Process A2—Compute the complex conjugate $x_1^*$, $x_2^*, \ldots, x_n^*$ of each of the information symbols $x_1$, $x_2, \ldots, x_n$.

Process A3—Generate, in accordance with equation (12), the encoded signals using the trigonometric values and complex conjugates computed in processes A1 and A2.

Process A4—Transmit the corresponding encoded signals for each antenna/epoch in accordance with equation (12).

The received signal model and the decoding will now be discussed. Consider a 3×3 MIMO system with channel matrix $H_3$ with i.i.d channel coefficients from $CN(0, N_0)$. Each row of the channel matrix corresponds to the channel vector between the three transmit antennas and the receive antenna at the receiver. For ease of convenience, each row is denoted as $h_r = [h_{0r}, h_{1r}, h_{2r}]$, where $r=\{0, 1, 2\}$ represents the row and indexes the receive antenna. The received signal at the $i^{th}$ receive antenna at the four epochs is $$\begin{bmatrix} z_i^1 \\ z_i^2 \\ z_i^3 \\ z_i^4 \end{bmatrix} = \sqrt{\frac{\rho}{3}} C_{P3} h_r + \begin{bmatrix} n_i^1 \\ n_i^2 \\ n_i^3 \\ n_i^4 \end{bmatrix}. \quad (14)$$

This can be rewritten in the equivalent virtual channel matrix (EVCM) form as $$\begin{bmatrix} z_i^1 \\ z_i^{2*} \end{bmatrix} = \sqrt{\frac{\rho}{3}} \begin{bmatrix} h_{1i} & h_{2i} \\ h_{2i}^* & -h_{1i}^* \end{bmatrix} \begin{bmatrix} x_1\sin\alpha_1 - x_2^*\cos\alpha_1 \\ x_3\sin\alpha_2 - x_4^*\cos\alpha_2 \end{bmatrix} + \begin{bmatrix} n_i^1 \\ n_i^{2*} \end{bmatrix} \quad (15)$$

$$\begin{bmatrix} z_i^2 \\ z_i^{4*} \end{bmatrix} = \sqrt{\frac{\rho}{3}} \begin{bmatrix} h_{1i} & h_{1i} \\ h_{1i}^* & -h_{1i}^* \end{bmatrix} \begin{bmatrix} x_1\sin\alpha_1 - x_2^*\cos\alpha_1 \\ x_3\sin\alpha_2 - x_4^*\cos\alpha_2 \end{bmatrix} + \begin{bmatrix} n_i^1 \\ n_i^{2*} \end{bmatrix}. \quad (16)$$

Assuming perfect channel state information (CSI), the channel equalization would result in $$\begin{bmatrix} q_i^1 \\ q_i^2 \end{bmatrix} = \sqrt{\frac{\rho}{3}} \begin{bmatrix} h_{1i}^* & h_{2i} \\ h_{2i}^* & -h_{1i} \end{bmatrix} \begin{bmatrix} z_i^1 \\ z_i^{2*} \end{bmatrix} = \quad (17)$$

$$\sqrt{\frac{\rho}{3}}(|h_{1i}|^2 + |h_{2i}|^2)\begin{bmatrix} x_1\sin\alpha_1 - x_2^*\cos\alpha_1 \\ x_3\sin\alpha_2 - x_4^*\cos\alpha_2 \end{bmatrix} + \begin{bmatrix} g_i^1 \\ g_i^{2*} \end{bmatrix}$$

$$\begin{bmatrix} q_i^3 \\ q_i^4 \end{bmatrix} = \sqrt{\frac{\rho}{3}} \begin{bmatrix} h_{0i}^* & h_{1i} \\ h_{1i}^* & -h_{0i} \end{bmatrix} \begin{bmatrix} z_i^3 \\ z_i^{4*} \end{bmatrix} = \quad (18)$$

$$\sqrt{\frac{\rho}{3}}(|h_{0i}|^2 + |h_{1i}|^2)\begin{bmatrix} x_5\sin\alpha_1 - x_6^*\cos\alpha_1 \\ x_7\sin\alpha_2 - x_8^*\cos\alpha_2 \end{bmatrix} + \begin{bmatrix} g_i^3 \\ g_i^{4*} \end{bmatrix}.$$

The sufficient statistic to jointly estimate the symbols $x_1$ and $x_2$ is $$\beta^1 = \frac{1}{3}\sum_{i=0}^{2} q_i^1. \quad (19)$$

Likewise, the sufficient statistics to estimate the symbol pairs $\{x_3, x_4\}$, $\{x_5, x_6\}$, and $\{x_7, x_8\}$ are $$\beta^2 = \frac{1}{3}\sum_{i=0}^{2} q_i^2, \beta^3 = \frac{1}{3}\sum_{i=0}^{2} q_i^3, \text{ and } \beta^4 = \frac{1}{3}\sum_{i=0}^{2} q_i^4. \quad (20)$$

To allow conditional ML decoding from the sufficient statistic, intermediate signals corresponding to each other are constructed as follows $$\tilde{\beta}^j = \beta^i - \sqrt{\frac{\rho}{27}} \Psi_m[-x_{2i}^* \cos \alpha_j] \qquad (21)$$

where $x_{2i}$ is one of the Q constellation points, i={1, 2, 3, 4} denotes the epoch, and m={1, 2} and j={1, 2} take values such that $$m = \begin{cases} 1 & \text{if } i = \{1, 2\}, \\ 2 & \text{if } i = \{3, 4\}. \end{cases} \qquad (22)$$

$$j = \begin{cases} 1 & \text{if } i = \{1, 3\}, \\ 2 & \text{if } i = \{2, 4\}. \end{cases} \qquad (23)$$

Here, $$\Psi_1 = \Sigma_p{}^2{}_{=0}(|h_{1p}|^2 + |h_{2p}|^2) \text{ and}$$

$$\Psi_2 = \Sigma_p{}^2{}_{=0}(|h_{0p}|^2 + |h_{1p}|^2), \text{ respectively.}$$

The values for $\alpha_1$ and $\alpha_2$ are chosen in a manner known in the art to maximize the coding gain. The ML estimate of the symbols $x_1$, $x_3$, $x_5$, $x_7$ conditional on $x_2$, $x_3$, $x_6$, $x_8$ respectively denoted by $x_{2i-1|2i}$ are obtained by feeding the intermediate signals to a threshold detector. For each of the Q constellation points, the conditional ML estimate that minimizes the following cost function yields the correct symbol pair $$\tau^j = \beta^i - \sqrt{\frac{\rho}{12}} \Psi_m[x_{2i-1|2i} \sin \alpha_j - x_{2i}^* \cos \alpha_j]^2. \qquad (24)$$

Full Diversity Analysis

Supposing that the two distinct 4×3 codeword matrices are X and U such that X is constructed from entries $$\{J_{x1,x2}{}^1, J_{x3,x4}{}^2, J_{x5,x6}{}^1, J_{x7,x8}{}^2\} \text{ and}$$

and U is constructed from $$\{J_{u1,u2}{}^1, J_{u3,u4}{}^2, J_{u5,u6}{}^1, J_{u7,u8}{}^2\}$$

The difference matrix $(X-U)_{P3}$ must be full rank for any two different codewords and can be obtained as $$(X-U)_{P3} = \begin{bmatrix} 0 & J_{d_1,d_2}^1 & J_{d_3,d_4}^2 \\ 0 & -J_{d_3,d_4}^{2*} & J_{d_1,d_2}^{1*} \\ J_{d_5,d_6}^1 & J_{d_7,d_8}^2 & 0 \\ -J_{d_7,d_8}^{2*} & J_{d_5,d_6}^{1*} & 0 \end{bmatrix}. \qquad (25)$$

Now, $$\det\{(X-U)_{P3}^H(X-U)_{P3}\} = (J_{d_5,d_6}^1{}^2 + J_{d_7,d_8}^2{}^2) \times (J_{d_1,d_2}^1{}^2 + J_{d_3,d_4}^2{}^2 + J_{d_5,d_6}^1{}^2 + J_{d_7,d_8}^2{}^2) \times (J_{d_1,d_2}^1{}^2 + J_{d_3,d_4}^2{}^2). \qquad (26)$$

where $$J_{d_i,d_{i+1}}{}^j = (x_1-u_1)\sin \alpha_j - (x_1-u_1)^* \cos \alpha_j.$$

It can be verified that the three terms of equation (26) are positive scalars.

Consequently, the Jagannath 4×3 STBC achieves full-rank and hence full diversity.

Jagannath 4×4 STBC

A rate-2 orthogonal design $C_{P4}$ for four transmit antennas according to embodiments, designated herein as "Jagannath 4×4 STBC," is provided in equation (27):

$$C_{P4} = \begin{bmatrix} x_1 \sin\alpha_1 - x_2^* \cos\alpha_1 & x_3 \sin\alpha_2 - x_4^* \cos\alpha_2 & 0 & 0 \\ -x_3^* \sin\alpha_2 + x_4 \cos\alpha_2 & x_1^* \sin\alpha_1 - x_2 \cos\alpha_1 & 0 & 0 \\ 0 & 0 & x_5 \sin\alpha_1 - x_6^* \cos\alpha_1 & x_7 \sin\alpha_2 - x_8^* \cos\alpha_2 \\ 0 & 0 & -x_7^* \sin\alpha_2 + x_8 \cos\alpha_2 & x_5^* \sin\alpha_1 - x_6 \cos\alpha_1 \end{bmatrix}. \qquad (27)$$

The orthogonality of the rate-2 Jagannath 4×4 STBC can be verified by $$C_{P4}^H C_{P4} = \begin{bmatrix} CI_2 & 0_2 \\ 0_2 & DI_2 \end{bmatrix}. \qquad (28)$$

Here, the columns are orthogonal to each other but the dot product of different columns are different.

Figure 2:
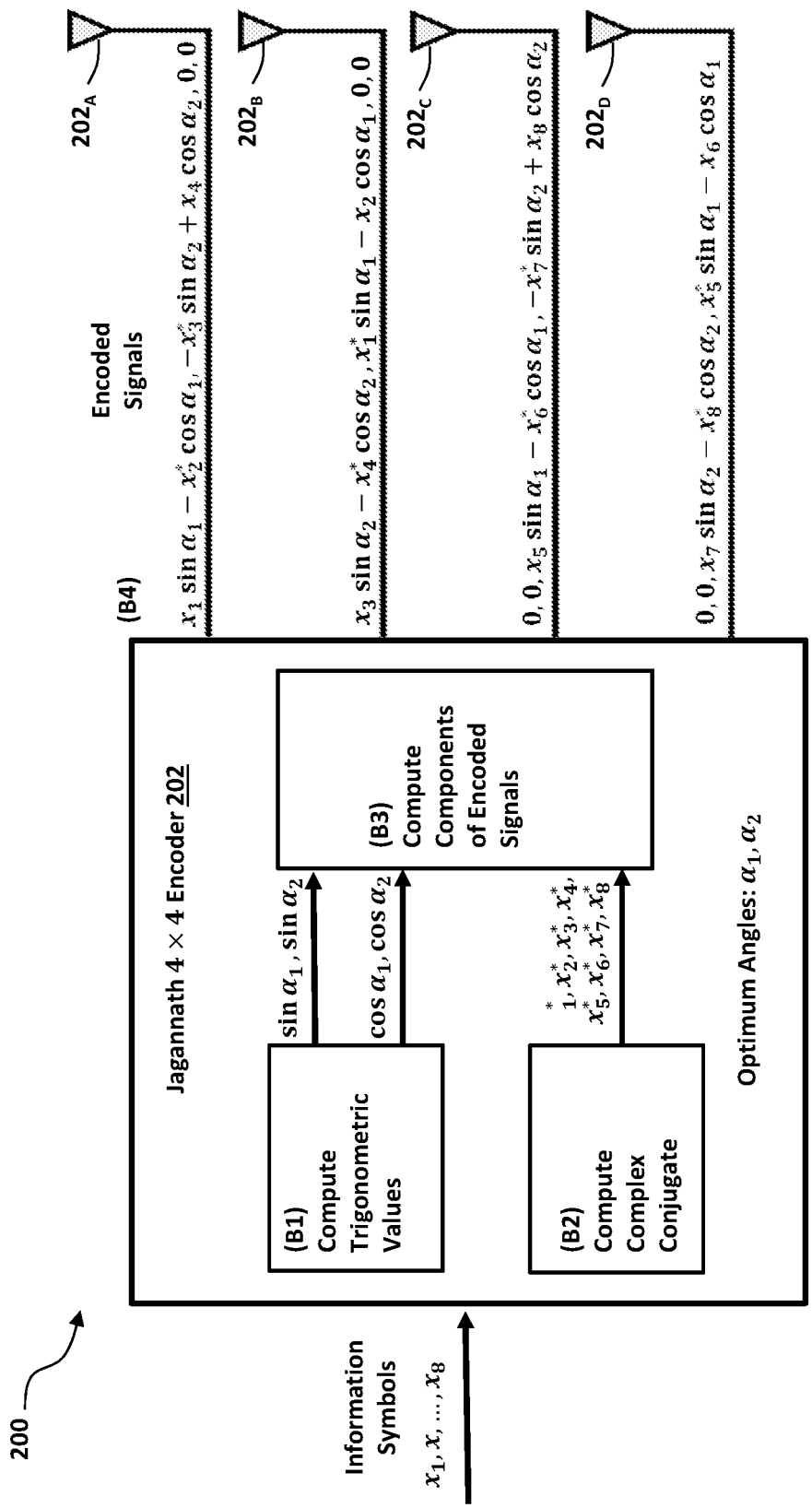
FIG. 2 depicts a data flow block diagram of a transmission system including a rate-2 full-diversity complex Jagannath 4×4 STBC encoder for a four antenna system according to embodiments.

FIG. 2 depicts a data flow block diagram of a transmission system 200 including a rate-2 full-diversity complex Jagannath 4×4 space-time block code (STBC) encoder 202 for a three antenna system according to embodiments.

As shown in FIG. 2, a set of information symbols $x_1$, $x_2$, ..., $x_n$ (e.g., quadrature amplitude modulation (QAM) information symbols) is encoded for transmission by the Jagannath 4×4 STBC encoder 202 in accordance with equation (27) from four transmit antennas $202_A$, $202_B$, $202_C$, $202_D$ over four epochs resulting in a rate-2 transmission. The Jagannath 4×4 STBC encoder 202 encodes the set of information symbols $x_1$, $x_2$, ..., $x_n$ into encoded signals, which are transmitted from the transmit antennas $202_A$, $202_B$, $202_C$, $202_D$ in accordance with equation (27).

According to embodiments, the Jagannath 4×4 STBC encoder 202 may perform the following processes:

Process B1—Compute trigonometric values (e.g., sine, cosine) for the angles $\alpha_1$ and $\alpha_2$, which may be chosen in a manner known in the art to maximize coding gain. (See, e.g., V. Vakilian and H. Mehrpouyan, "High Rate/Low Complexity Space-Time Block Codes for 2×2 Reconfigurable MIMO Systems," IEEE Communications Letters, vol. 20, pp. 1227-1230, June 2016).

Process B2—Compute the complex conjugate $x^*_1$, $x^*_2$, ..., $x^*_n$ of each of the information symbols $x_1$, $x_2$, ..., $x_n$.

Process B3—Generate, in accordance with equation (27), the encoded signals using the trigonometric values and complex conjugates computed in processes B1 and B2.

Process B4—Transmit the corresponding encoded signals for each antenna/epoch in accordance with equation (27).

The channel matrix of the Jagannath 4×4 STBC can be denoted as $H^4$, whose row each row is denoted as $h_r=[h_{0r}, h_{1r}, h_{2r}, h_{3r}]$, where $r=\{0, 1, 2, 3\}$. The received signal at the $i^{th}$ antenna during the four epochs can be represented by $$\begin{bmatrix} z_i^1 \\ z_i^2 \\ z_i^3 \\ z_i^4 \end{bmatrix} = \sqrt{\frac{\rho}{4}} C_{P4} h_r + \begin{bmatrix} n_i^1 \\ n_i^2 \\ n_i^3 \\ n_i^4 \end{bmatrix} \quad (29)$$

In a similar manner to the Jagannath 4×3 STBC, equation (29) can be rewritten to an EVCM form as $$\begin{bmatrix} z_i^1 \\ z_i^{2*} \\ z_i^3 \\ z_i^{4*} \end{bmatrix} = \sqrt{\frac{\rho}{4}} \begin{bmatrix} h_{0i} & h_{1i} & 0 & 0 \\ h_{1i}^* & -h_{0i}^* & 0 & 0 \\ 0 & 0 & h_{2i} & h_{3i} \\ 0 & 0 & h_{3i}^* & -h_{2i}^* \end{bmatrix} \begin{bmatrix} x_1 \sin\alpha_1 - x_2^* \cos\alpha_1 \\ x_3 \sin\alpha_2 - x_4^* \cos\alpha_2 \\ x_5 \sin\alpha_1 - x_6^* \cos\alpha_1 \\ x_7 \sin\alpha_1 - x_8^* \cos\alpha_1 \end{bmatrix} + \begin{bmatrix} n_i^1 \\ n_i^{2*} \\ n_i^3 \\ n_i^{4*} \end{bmatrix}. \quad (30)$$

The channel equalization yields $$\begin{bmatrix} q_i^1 \\ q_i^2 \\ q_i^3 \\ q_i^4 \end{bmatrix} = \sqrt{\frac{\rho}{4}} \begin{bmatrix} (|h_{0i}|^2 + |h_{1i}|^2) & 0 & 0 & 0 \\ 0 & (|h_{0i}|^2 + |h_{1i}|^2) & 0 & 0 \\ 0 & 0 & (|h_{2i}|^2 + |h_{3i}|^2) & 0 \\ 0 & 0 & 0 & (|h_{2i}|^2 + |h_{3i}|^2) \end{bmatrix} \begin{bmatrix} x_1 \sin\alpha_1 - x_2^* \cos\alpha_1 \\ x_3 \sin\alpha_2 - x_4^* \cos\alpha_2 \\ x_5 \sin\alpha_1 - x_6^* \cos\alpha_1 \\ x_7 \sin\alpha_1 - x_8^* \cos\alpha_1 \end{bmatrix} + \begin{bmatrix} g_i^1 \\ g_i^2 \\ g_i^3 \\ g_i^4 \end{bmatrix}. \quad (31)$$

The sufficient statistics and the intermediate symbol representation to decode the symbol pairs can be obtained in a similar manner as $$\beta^i = \frac{1}{4} \sum_{t=0}^{3} q_t^i \quad (32)$$

$$\tilde{\beta}^j = \beta^i - \sqrt{\frac{\rho}{64}} \Psi m[-x_{2i}^* \cos\alpha_j] \quad (33)$$

For each of the Q constellation points, the conditional ML estimate $(x_{2i-1|2i})$ that minimizes the following cost function yields the correct symbol pair.

$$T^i = \tilde{\beta}^j - \sqrt{\frac{\rho}{64}} \Psi m[x_{2i-1|2i} \sin\alpha_j - x_{2i}^* \cos\alpha_j]^2. \quad (34)$$

Here, i, m, j are the same notations as in the Jagannath 4×3 STBC, while $$\Psi_1 = \sum_{p=0}^{3} (|h_{0p}|^2 + |h_{1p}|^2), \Psi_2 = \sum_{p=0}^{3} (|h_{2p}|^2 + |h_{3p}|^2). \quad (35)$$

The conditional ML decoding procedure presented for both the Jagannath 4×3 STBC and the Jagannath 4×4 STBC provides a very low decoding complexity of $\mathcal{O}(Q)$. One tradeoff is the unequal energy on the antennas due to the transmission of zeros in the codeword. The energy can be normalized by multiplying the Jagannath 4×4 STBC with a normalized Hadamard matrix of order 4 prior to transmission and performing the reverse operation by multiplying by the transpose of Hadamard matrix. Similarly, the Jagannath 4×3 STBC can be efficiently precoded to minimize the peak to average power ratio.

Full Diversity Analysis

Supposing that the two distinct 4×4 codeword matrices are X and U such that X is constructed from the entries $\{J_{x_1,x_2}^1, J_{x_3,x_4}^2, J_{x_5,x_6}^1, J_{x_7,x_8}^2\}$ and and U is constructed from $\{J_{u_1,u_2}^1, J_{u_3,u_4}^2, J_{u_5,u_6}^1, J_{u_7,u_8}^2\}$.

The difference matrix $(X-U)_{P4}$ contains the elements $\{J_{d_1,d_2}^1, J_{d_3,d_4}^2, J_{d_5,d_6}^1, J_{d_7,d_8}^2\}$.

The full diversity criterion can then be expresses as $$|\det\{(X-U)_{P4}\}|^2 == |(|J_{d_1,d_2}^1|^2 + |J_{d_3,d_4}^2|^2)|^2 |(|J_{d_5,d_6}^1|^2 + |J_{d_7,d_8}^2|^2)|^2. \quad (36)$$

Clearly, equation (36) is a positive scalar. Hence, the full diversity of the Jagannath 4×4 STBC is clearly stated.

In Table 1, the rates and delays of some known STBCs and the Jagannath 4×3 and 4×4 STBCs are compared.

TABLE 1

| Design | TX antennas | Rate | Delay |
| --- | --- | --- | --- |
| Jagannath 4 × 3 | 3 | 2 | 4 |
| Jagannath 4 × 4 | 4 | 2 | 4 |
| ACIOD [20] | 3 | 1 | 4 |
| CIOD [20] | 4 | 1 | 4 |
| Jafarkhani [11] | 4 | 1 | 4 |
| Ozbek.et.al [7] | 3 | 1 | 4 |
| Tarokh et. al [19] | 3 | 3/4 | 4 |
| Tarokh et. al [19] | 4 | 3/4 | 4 |
| Grover et. al [24] | 4 | 1 | 8 |

It should be noted that the Jagannath 4×3 STBC and 4×4 STBC provide a very high rate of 2 in comparison to known STBCs without exceeding the minimum delay associated with the known STBCs.

Figure 3:
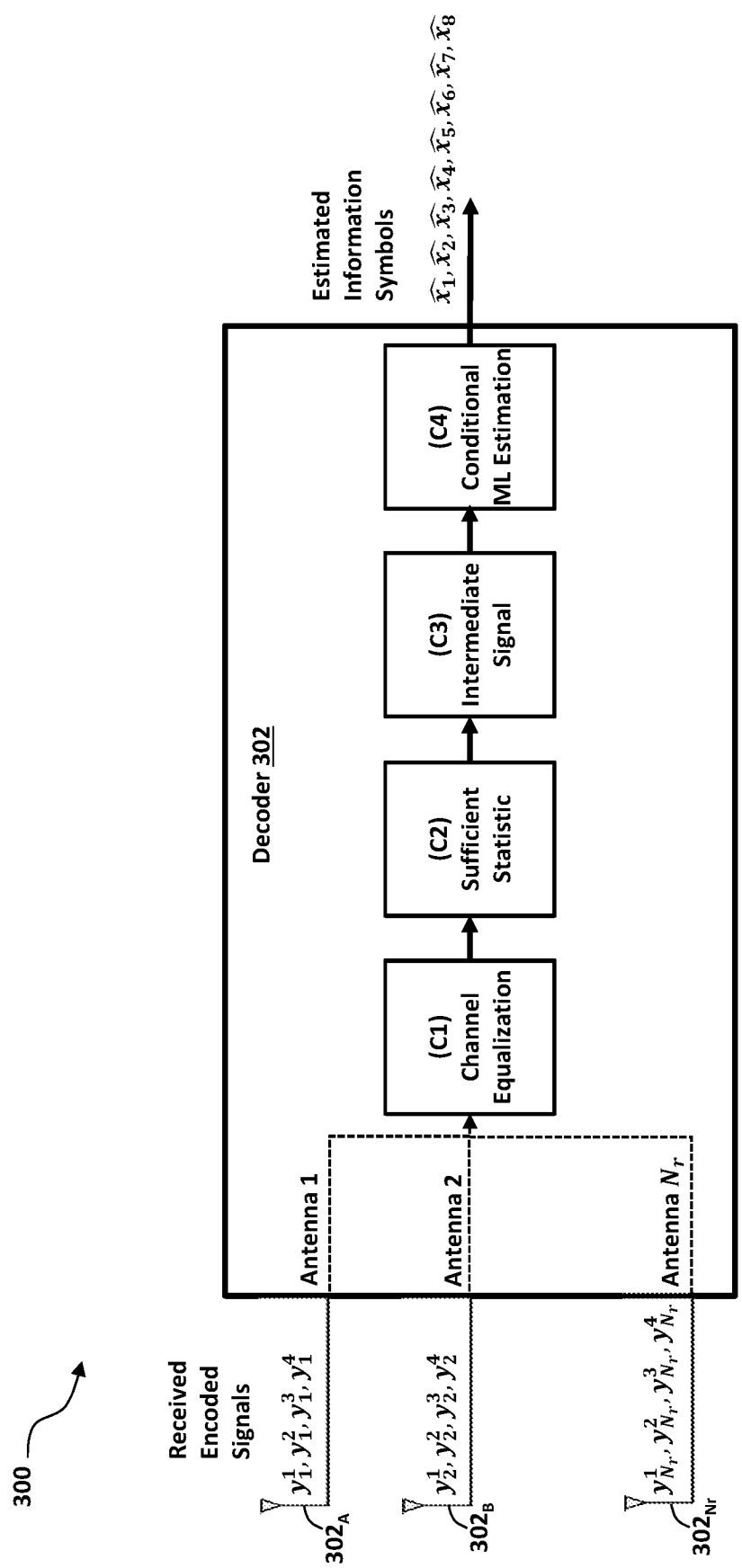
FIG. 3 depicts a data flow block diagram of a receiving system including a decoder for decoding the signals received from the Jagannath 4×3 STBC encoder of FIG. 1 and the Jagannath 4×4 STBC encoder of FIG. 2 according to embodiments.

FIG. 3 depicts a data flow block diagram of a receiving system 300 including a decoder 302 for decoding the signals received from the Jagannath 4×3 STBC encoder 102 of FIG. 1 and the Jagannath 4×4 STBC encoder 202 of FIG. 2 according to embodiments. Specific details of the processes performed by the decoder 302 have been presented in greater detail above. The decoder 302 may generally include a plurality of receive antennas $302_A$, $302_B$, ..., $302_{N_r}$ for receiving encoded data signals. At process C1, channel equalization is performed. At process C2, sufficient statistics are determined for estimating information symbols in the received encoded signals. At process C3, intermediate signals for the sufficient statistics are determined based on the sufficient statistics. At process C4, conditional ML estimation is performed based on the intermediate signals to output estimated information symbols. Specific details of the decoding processes have been presented in greater detail above.

Simulation Results

Figure 4:
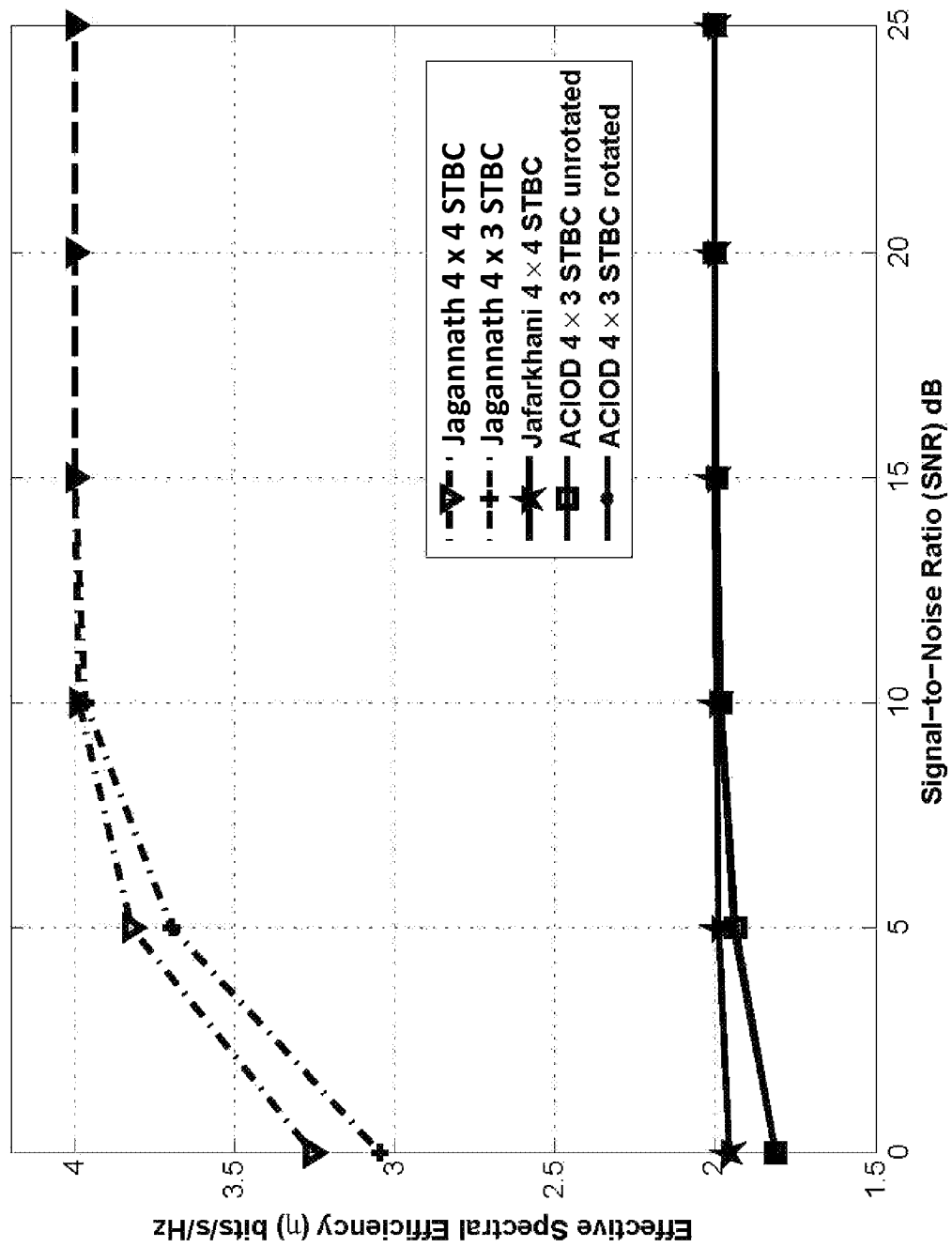
FIG. 4 depicts a graph comparing the effective spectral efficiency of the 4×3 and 4×4 Jagannath STBCs with that of ACIOD and Jafarkhani using a QAM-4 modulation scheme.

In this section, the simulation results of the Jagannath 4×3 and 4×4 STBCs are compared with some known STBCs. An effective spectral efficiency defined as follows $$\eta=[1-SER]R \log_2 Q \qquad (37)$$

and a Signal-to-Noise ratio (SNR)/Coding gain were used as performance metrics to benchmark the Jagannath 4×3 and 4×4 STBCs. Here, SER denotes the symbol error rate. For three transmit antennas, the 4×3 Jagannath STBC is compared with the ACIOD design for three transmit antennas. For four transmit antennas, the 4×4 Jagannath STBC is compared to the Jafarkhani 4×4 STBC. The simulations are performed with a flat-fading Rayleigh channel in additive white Gaussian noise with i.i.d entries from CN(0, N₀). Each data point on the curve is an average over 10,000 repetitions. FIG. 4 compares the effective spectral efficiency of the 4×3 and 4×4 Jagannath STBCs with that of ACIOD and Jafarkhani using a QAM-4 modulation scheme. With QAM-4 modulation, the maximum achievable spectral efficiency for the 4×3 and 4×4 Jagannath STBCs is 4 bits/s/Hz while that of ACIOD and Jafarkhani is 2 bits/s/Hz. All designs achieve their maximum achievable spectral efficiency at an SNR of 10 dB and above. The spectral efficiency gain by a factor of 2 achieved with the 4×3 and 4×4 Jagannath STBCs is clearly noticeable in FIG. 4.

Figure 5:
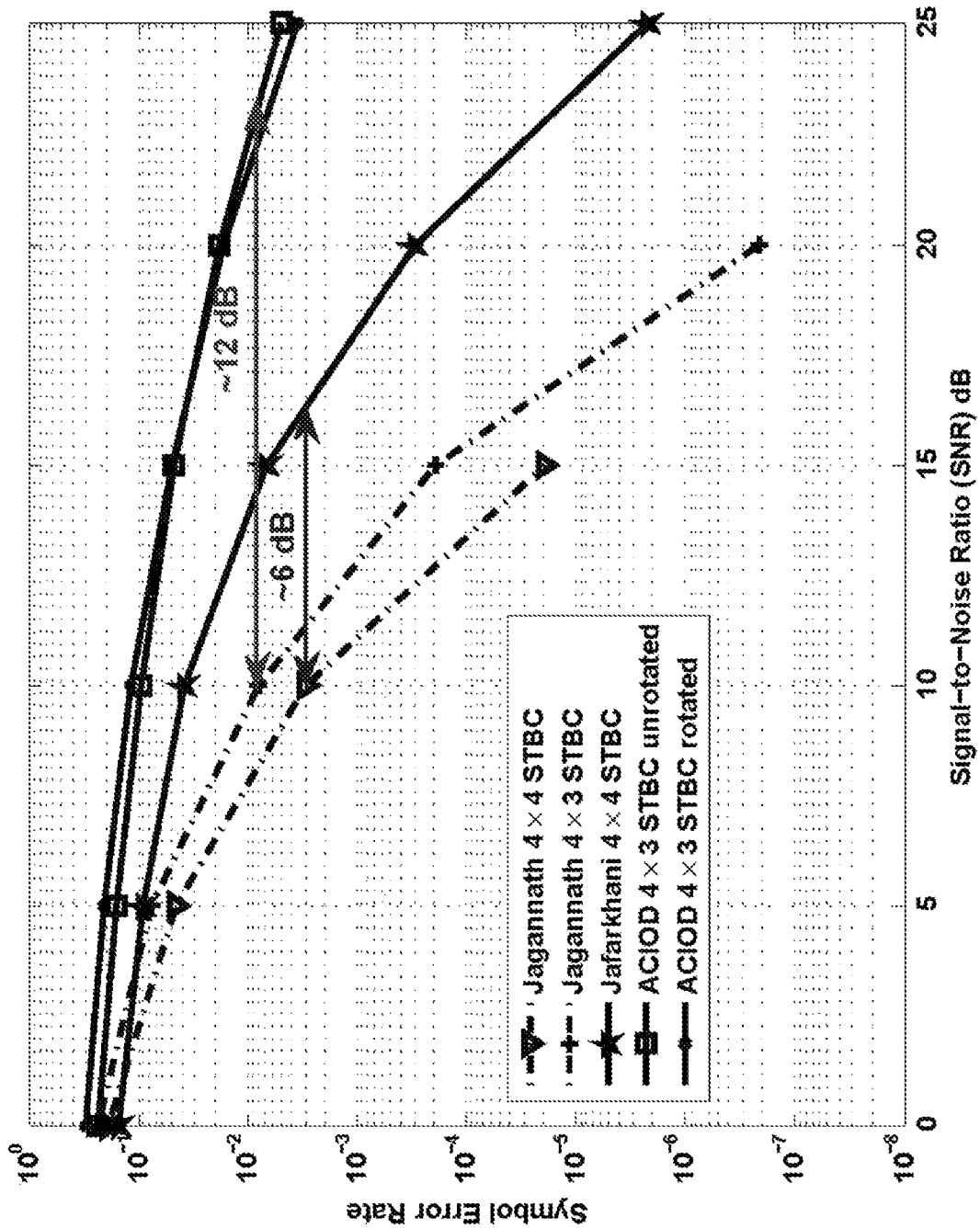
FIG. 5 depicts a graph comparing the SER performance of the 4×3 and 4×4 Jagannath STBCs at a fixed spectral efficiency (4 bits/s/Hz) with that of ACIOD and Jafarkhani.

FIG. 5 benchmarks the SER performance of the 4×3 and 4×4 Jagannath STBCs at a fixed spectral efficiency (4 bits/s/Hz) with that of ACIOD and Jafarkhani. The ACIOD and Jafarkhani use QAM-16 to attain a spectral efficiency of 4 bits/s/Hz. The rotated and unrotated versions of ACIOD are compared since the ACIOD design achieves full diversity only when the QAM constellation is rotated at an angle 31.7175°. Even though all designs start off at a comparable SER, the performance of the 4×3 and 4×4 Jagannath STBCs significantly improves with increasing SNR owing to their full diversity property. The substantial coding gain achieved with the 4×3 and 4×4 Jagannath STBCs is observable, for example, at approximately 6 dB and 12 dB for the 4×3 and 4×4 Jagannath STBCs, respectively. This performance gain can be attributed to the full diversity property of the 4×3 and 4×4 Jagannath STBCs while the Jafarkhani design only provides partial diversity. The unrotated version of ACIOD cannot achieve full diversity and hence performs poorly. Comparing the rotated and unrotated versions of ACIOD with each other, the benefit from rotating the constellation can be faintly noted at higher SNR values.

According to embodiments, very high rate (e.g., rate-2) 4×3 and 4×4 Jagannath STBCs that achieve full diversity and have a low decoding complexity of $\mathcal{O}(Q)$ have been disclosed. Such STBCs with very high rate and low complexity decoding are generally desired in practical applications. Previously known STBC codes for three and four transmit antennas cannot support a rate more than 1 and have a much higher decoding complexity (e.g., $\mathcal{O}(Q^4)$).

Figure 6:
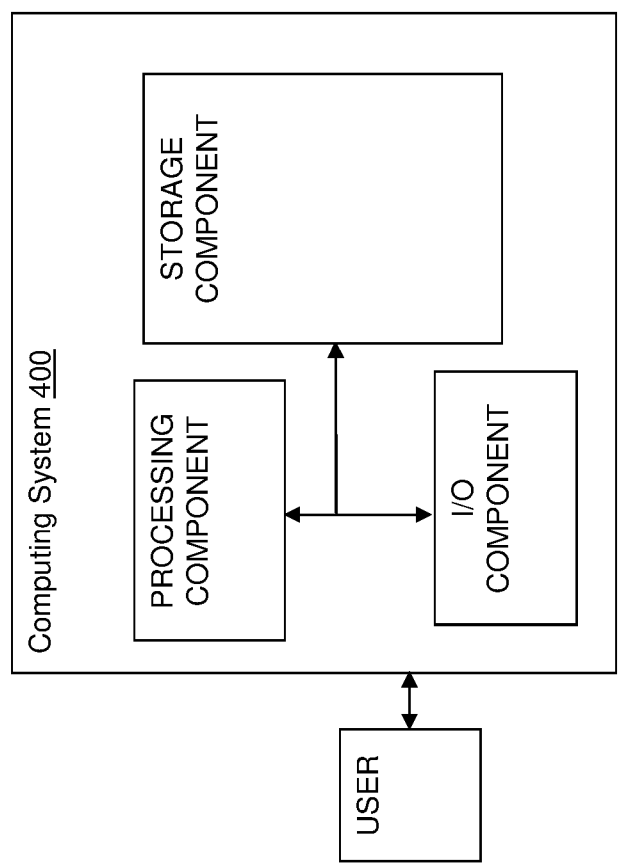
FIG. 6 depicts an illustrative computing system for implementing embodiments of the disclosure.

FIG. 6 depicts an illustrative computing system 400 for implementing the present invention, according to embodiments. The computing system 400 may comprise any type of computing device, and for example includes at least one processor, memory, an input/output (I/O) (e.g., one or more I/O interfaces and/or devices), and a communications pathway. In general, processor(s) execute program code, such as program code to implement some or all of the Jagannath 4×3 STBC encoder 102, Jagannath 4×4 STBC encoder 202, and decoder 302, which is at least partially fixed in memory. While executing program code, processor(s) can process data, which can result in reading and/or writing transformed data from/to memory and/or I/O for further processing. The pathway provides a communications link between each of the components in computing system 400. I/O can comprise one or more human I/O devices, which enable a user to interact with computing system 400.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the program product of the present invention may be manually loaded directly in a computer system via a storage medium such as a CD, DVD, etc., the program product may also be automatically or semi-automatically deployed into a computer system by sending the program product to a central server or a group of central servers. The program product may then be downloaded into client computers that will execute the program product. Alternatively, the program product may be sent directly to a client system via e-mail. The program product may then either be detached to a directory or loaded into a directory by a button on the e-mail that executes a program that detaches the program product into a directory. Another alternative is to send the program product directly to a directory on a client computer hard drive.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The invention claimed is:

1. A transmission system, comprising:
an encoder for encoding a set of information symbols into a set of encoded signals for transmission, wherein the encoder applies a space-time block code (STBC) to the set of information symbols; and
three antennas for transmitting the set of encoded signals over four epochs at a code rate of two,
wherein the STBC comprises:

$$C_{P3} = \begin{bmatrix} 0 & x_1\sin\alpha_1 - x_2^*\cos\alpha_1 & x_3\sin\alpha_2 - x_4^*\cos\alpha_2 \\ 0 & -x_3^*\sin\alpha_2 + x_4\cos\alpha_2 & x_1^*\sin\alpha_1 - x_2\cos\alpha_1 \\ x_5\sin\alpha_1 - x_6^*\cos\alpha_1 & x_7\sin\alpha_2 - x_8^*\cos\alpha_2 & 0 \\ -x_7^*\sin\alpha_2 + x_8\cos\alpha_2 & x_5^*\sin\alpha_1 - x_6\cos\alpha_1 & 0 \end{bmatrix}$$

where $x_1, x_2, \ldots, x_8$ comprise the set of information symbols, $x^*_1, x^*_2, \ldots, x^*_8$ comprise complex conjugates of each of the information symbols $x_1, x_2, \ldots, x_8$, and $\alpha_1$ and $\alpha_2$ comprise coding gain maximizing angles.

2. The transmission system according to claim 1, wherein the STBC is orthogonal.

3. The transmission system according to claim 1, wherein the set of encoded signals have a decoding complexity of $\mathcal{O}(Q)$ for a constellation cardinality of Q.

4. A transmission system, comprising:
an encoder for encoding a set of information symbols into a set of encoded signals for transmission, wherein the encoder applies a space-time block code (STBC) to the set of information symbols; and
four antennas for transmitting the set of encoded signals over four epochs at a code rate of two, wherein the STBC comprises:

$$C_{P4} = \begin{bmatrix} x_1\sin\alpha_1 - x_2^*\cos\alpha_1 & x_3\sin\alpha_2 - x_4^*\cos\alpha_2 & 0 & 0 \\ -x_3^*\sin\alpha_2 + x_4\cos\alpha_2 & x_1^*\sin\alpha_1 - x_2\cos\alpha_1 & 0 & 0 \\ 0 & 0 & x_5\sin\alpha_1 - x_6^*\cos\alpha_1 & x_7\sin\alpha_2 - x_8^*\cos\alpha_2 \\ 0 & 0 & -x_7^*\sin\alpha_2 + x_8\cos\alpha_2 & x_5^*\sin\alpha_1 - x_6\cos\alpha_1 \end{bmatrix}$$

where $x_1, x_2, \ldots, x_8$ comprise the set of information symbols, $x^*_1, x^*_2, \ldots, x^*_8$ comprise complex conjugates of each of the information symbols $x_1, x_2, \ldots, x_8$, and $\alpha_1$ and $\alpha_2$ comprise coding gain maximizing angles.

5. The transmission system according to claim 4, wherein the STBC is orthogonal.

6. The transmission system according to claim 4, wherein the set of encoded signals have a decoding complexity of $\mathcal{O}(Q)$ for a constellation cardinality of Q.

7. A method for transmitting data, comprising:
encoding a set of information symbols into a set of encoded signals by applying a space-time block code (STBC) to the set of information symbols; and
transmitting the set of encoded signals over four epochs using three antennas at a code rate of two,
wherein the STBC comprises:

$$C_{P3} = \begin{bmatrix} 0 & x_1\sin\alpha_1 - x_2^*\cos\alpha_1 & x_3\sin\alpha_2 - x_4^*\cos\alpha_2 \\ 0 & -x_3^*\sin\alpha_2 + x_4\cos\alpha_2 & x_1^*\sin\alpha_1 - x_2\cos\alpha_1 \\ x_5\sin\alpha_1 - x_6^*\cos\alpha_1 & x_7\sin\alpha_2 - x_8^*\cos\alpha_2 & 0 \\ -x_7^*\sin\alpha_2 + x_8\cos\alpha_2 & x_5^*\sin\alpha_1 - x_6\cos\alpha_1 & 0 \end{bmatrix}$$

where $x_1, x_2, \ldots, x_8$ comprise the set of information symbols, $x^*_1, x^*_2, \ldots, x^*_8$ comprise complex conjugates of each of the information symbols $x_1, x_2, \ldots, x_8$, and $\alpha_1$ and $\alpha_2$ comprise coding gain maximizing angles.

8. The method according to claim 7, wherein the STBC is orthogonal.

9. The method according to claim 7, wherein the set of encoded signals have a decoding complexity of $\mathcal{O}(Q)$ for a constellation cardinality of Q.

10. A method for transmitting data, comprising:
encoding a set of information symbols into a set of encoded signals by applying a space-time block code (STBC) to the set of information symbols; and
transmitting the set of encoded signals over four epochs using four antennas at a code rate of two, wherein the STBC comprises:

$$C_{P4} = \begin{bmatrix} x_1\sin\alpha_1 - x_2^*\cos\alpha_1 & x_3\sin\alpha_2 - x_4^*\cos\alpha_2 & 0 & 0 \\ -x_3^*\sin\alpha_2 + x_4\cos\alpha_2 & x_1^*\sin\alpha_1 - x_2\cos\alpha_1 & 0 & 0 \\ 0 & 0 & x_5\sin\alpha_1 - x_6^*\cos\alpha_1 & x_7\sin\alpha_2 - x_8^*\cos\alpha_2 \\ 0 & 0 & -x_7^*\sin\alpha_2 + x_8\cos\alpha_2 & x_5^*\sin\alpha_1 - x_6\cos\alpha_1 \end{bmatrix}$$

where $x_1, x_2, \ldots, x_8$ comprise the set of information symbols, $x^*_1, x^*_2, \ldots, x^*_8$ comprise complex conjugates of each of the information symbols $x_1, x_2, \ldots, x_8$, and $\alpha_1$ and $\alpha_2$ comprise coding gain maximizing angles.

11. The method according to claim 10, wherein the STBC is orthogonal.

12. The method according to claim 10, wherein the set of encoded signals have a decoding complexity of $\mathcal{O}(Q)$ for a constellation cardinality of Q.

13. A communication system, comprising:
a transmission system including:
an encoder for encoding a set of information symbols into a set of encoded signals for transmission, wherein the encoder applies a space-time block code (STBC) to the set of information symbols; and
three antennas for transmitting the set of encoded signals over four epochs at a code rate of two;
and
a receiving system for decoding the set of encoded signals, the decoding having a complexity of $\mathcal{O}(Q)$ for a constellation cardinality of Q, wherein the STBC comprises:

$$C_{P3} = \begin{bmatrix} 0 & x_1\sin\alpha_1 - x_2^*\cos\alpha_1 & x_3\sin\alpha_2 - x_4^*\cos\alpha_2 \\ 0 & -x_3^*\sin\alpha_2 + x_4\cos\alpha_2 & x_1^*\sin\alpha_1 - x_2\cos\alpha_1 \\ x_5\sin\alpha_1 - x_6^*\cos\alpha_1 & x_7\sin\alpha_2 - x_8^*\cos\alpha_2 & 0 \\ -x_7^*\sin\alpha_2 + x_8\cos\alpha_2 & x_5^*\sin\alpha_1 - x_6\cos\alpha_1 & 0 \end{bmatrix}$$

where $x_1, x_2, \ldots, x_8$ comprise the set of information symbols, $x^*_1, x^*_2, \ldots, x^*_8$ comprise complex conjugates of each of the information symbols $x_1, x_2, \ldots, x_8$, and $\alpha_1$ and $\alpha_2$ comprise coding gain maximizing angles.

14. The communication system according to claim 13, wherein the STBC is orthogonal.

15. A communication system, comprising:
a transmission system including:
an encoder for encoding a set of information symbols into a set of encoded signals for transmission, wherein the encoder applies a space-time block code (STBC) to the set of information symbols; and
four antennas for transmitting the set of encoded signals over four epochs at a code rate of two;
and
a receiving system for decoding the set of encoded signals, the decoding having a complexity of $\mathcal{O}(Q)$ for a constellation cardinality of Q, wherein the STBC comprises:

$$C_{P4} = \begin{bmatrix} x_1\sin\alpha_1 - x_2^*\cos\alpha_1 & x_3\sin\alpha_2 - x_4^*\cos\alpha_2 & 0 & 0 \\ -x_3^*\sin\alpha_2 + x_4\cos\alpha_2 & x_1^*\sin\alpha_1 - x_2\cos\alpha_1 & 0 & 0 \\ 0 & 0 & x_5\sin\alpha_1 - x_6^*\cos\alpha_1 & x_7\sin\alpha_2 - x_8^*\cos\alpha_2 \\ 0 & 0 & -x_7^*\sin\alpha_2 + x_8\cos\alpha_2 & x_5^*\sin\alpha_1 - x_6\cos\alpha_1 \end{bmatrix}$$

where $x_1, x_2, \ldots, x_8$ comprise the set of information symbols, $x^*_1, x^*_2, \ldots, x^*_8$ comprise complex conjugates of each of the information symbols $x_1, x_2, \ldots, x_8$, and $\alpha_1$ and $\alpha_2$ comprise coding gain maximizing angles.

16. The communication system according to claim 15, wherein the STBC is orthogonal.

\* \* \* \* \*